3,177,268
BLENDS OF POLY(METHYL METHACRYLATE) AND GRAFT COPOLYMER RESIN
Walter J. Frazer and Thomas S. Grabowski, both of Vienna, W. Va., assignors to Borg-Warner Corporation, Chicago, Ill., a corporation of Illinois
No Drawing. Filed May 1, 1961, Ser. No. 106,521
6 Claims. (Cl. 260—876)

The present invention relates to synthetic resin blends having new and unique properties. More particularly, the invention relates to synthetic resin blends exhibiting unobvious and unexpected thermoplastic properties. The invention relates to a molding composition comprising a blend of (a) poly(methyl methacrylate) and (b) a graft copolymer of (1) polymerized diene rubber obtained from a small particle size diene rubber latex and (2) a mixture of an ethylenically unsaturated cyanide selected from the group consisting of acrylonitrile, methacrylonitrile, and ethacrylonitrile and a vinylidene aromatic hydrocarbon.

Resins (a) and (b) find considerable utility in the injection molding of structural shapes. However, due to the low thermoplasticity of both resins, their use for structural shapes formed by the injection molding technique is somewhat limited.

It has been found that by blending resin (a) with resin (b) a composition suitable for the injection molding of structural shapes is obtained, and that an extraordinary improvement in the flow characteristic not found in either of the resins is obtained. The Melt Index of the blend is many times better than the Melt Index of either of the component resins.

It is therefore an object of the present invention to provide an injection molding composition having greatly improved flow characteristics.

In practicing the present invention, the poly(methyl methacrylate) and the graft copolymer are prepared and the two resins are then blended on a Banbury mixer or similar mixing equipment. The poly(methyl methacrylate) used in the present blends was one having the following physical properties:

| | |
|---|---|
| Izod impact strength, ft.lb./inch notch, ⅛" bar | .7 |
| Tensile strength, p.s.i., 73° F. | 8700 |
| Tensile elongation | 60% |
| Hardness, Rockwell | R–121, L–112 |
| Melt index, 410° F. | 1.5A3 |
| Flexural modulus, p.s.i., ¼" x ½" x 6", 73° F. | 4.3×10⁵ |
| Flexural strength, 73° F. | 11,520 |
| Deflection temperature, ° F., ½" x ½" x 5" bar, 66 p.s.i. | 213 |
| Deflection temperature, ° F., ½" x ½" x 5" bar, 264 p.s.i. | 195 |

[1] A modification of the procedure set forth in A.S.T.M. Method D–1238–52T. This procedure was originally developed for determining the melt index of polyethylene. Broadly and briefly, in this method, the weight in grams of polyethylene that is discharged during a period of three minutes through a standard orifice positioned below a reservoir of the polymer that is at a standard temperature and under a standard pressure is determined. This determination is proportioned to give the grams of polymer discharged during ten minutes which figure is, by definition, the melt index of polyethylene.

Since the thermoplasticity of the blends with which this invention is concerned is not even of the same order of magnitude as that of polyethylene, a considerable modification of the standard conditions and dimensions set forth in A.S.T.M. Method D–1238 had to be made in order to make this general method applicable to the blends with which this invention is concerned. These modifications involved changes in the size of the orifice, the pressure applied to the plastic in the reservoir, the reservoir temperature, and the like.

THE GRAFT COPOLMER

The graft copolymer component of the present invention is prepared by polymerizing acrylonitrile and styrene in the presence of a polymerized diene rubber obtained from a small particle size diene rubber latex.

A preferred *diene rubber latex* component used to provide the polymerized diene rubber of the graft copolymer is one having a majority of the particles in the latex of a size less than about 1,000 angstroms, and preferably less than about 800 angstroms. An example of a particularly preferred diene rubber latex is one having particles ranging in size from 100 to 1000 angstroms with a predominant portion of the particles in the 500 to 700 angstrom range. As is well known, the particle size of the diene rubber latex may be varied over a wide range by appropriate changes in the polymerization recipe. If, for example, the soap concentration of the reaction mixture is high, a large number of micelles are formed on emulsification. This gives rise to a fast polymerization reaction and results in the production of a latex having relatively small particles. On the other hand, if the soap concentration of the reaction mixture is low, a small number of micelles are formed on emulsification. This gives rise to a slow polymerization reaction and results in the production of a latex having relatively large particles.

The diene rubber latex used in accordance with this invention may be, for example, a latex of a synthetic rubber prepared by the polymerization of monomers such as butadiene and/or isoprene with or without the addition of substantial but minor proportions of acrylonitrile, methacrylonitrile, styrene, methyl styrene, alpha methyl styrene and the like. Suitable cross-linking monomers, such as, for example, divinyl benzene and the like may be incorporated therein. Suitable non-cross-linking monomers may be used, such as for example, monoethylenic and conjugated diethylenic unsaturated compounds, such as vinyl acetate, vinyl stearate, vinyl naphthalene, methyl vinyl ether and the like.

The polymerized diene rubber constituent of the graft copolymer is prepared in the following manner. A conjugated diolefin, such as butadiene or isoprene together with suitable cross-linking or non-cross-linking comonomers is emulsified in water with the aid of micelle-forming emulsifying agents. Fatty acid soaps prepared from lauric, myristic, palmitic, oleic as well as sodium disproportionated-resinates are typical emulsifying agents suitable for this purpose. Cationic emulsifiers, such as dodecylamine hydrochloride and rosin acid soaps are also used as emulsifying agents. The polymerization mixture contains a suitable water soluble free radical-generating catalyst such as a peroxide, or a persulfate. In addition, a modifier or regulator, such as a mercaptan, may be present in small amounts. The modifier acts as a chain transfer agent and limits the growth of the polymer chains. Polymerization is carried out under suitable conditions such as, for example, from about 0° C. to about 100° C. and autogenous pressure until a substantial portion (preferably in excess of 80%) of the conjugated diolefin is polymerized. The unreacted conjugated di- As used herein, melt indexes express the weight in grams of polymer blend discharged in one minute through an orifice 0.125 inch in diameter and 0.315 inch long from a reservoir 0.373 inch in diameter containing polymer maintained at a temperature of 410° F. and under a pressure produced by a 5664 g. load. Thus, a melt index of .5A3 means that .5 g. of polymer were discharged through the orifice in three minutes under the conditions named. Similarly, a melt index of .8A1, for example, means that .8 g. of polymer was discharged through the orifice in one minute under the named conditions.

olefin may be stripped off from the latex prior to the graft polymerization step.

A small particle size diene rubber latex was prepared using the following recipe:

| | |
|---|---|
| Butadiene | 100.00 |
| Demineralized water | 125.00 |
| Potassium oleate | 2.0 |
| $K_2S_2O_8$ | 0.3 |
| (60:20:20, $C_{12}$:$C_{14}$:$C_{16}$) mercaptan modifier | 0.2 |
| KOH | 0.1 |

The mixture was injected into a reactor and allowed to polymerize for a period of 18 hours under autogeneous pressure at a temperature of 65° C. The polymerized diene rubber was analyzed to determine the particle size, using a conventional electron microscope technique. The sample was brominated to prevent flattening and distortion of the latex particles under the electron beam. The particles ranged in size from 100 angrstroms to 1,000 anstroms with the majority of the particles having a size of about 500 angstroms.

The preparation of a typical graft copolymer suitable for use in the preparation of the unique blends of this invention is as follows:

| | |
|---|---|
| Polymerized rubber (prepared as described hereinabove) | 45 |
| Styrene | 40 |
| Acrylonitrile | 15 |
| $Na_4P_2O_7$ (anh.) | 0.5 |
| Dextrose | 1.0 |
| Water | 182.0 |
| Sodium salt of hydrogenated disproportionated rosin | 1.85 |
| NaOH | 0.105 |
| $FeSO_4 \cdot 7H_2O$ | 0.011 |
| Mixed tertiary mercaptan (60:20:20 of $C_{12}$:$C_{14}$:$C_{16}$) | 0.5 |
| Cumene hydroperoxide | 1.0 |

The appropriate recipes were charged into a pressure tight reactor. The reactor was placed in a water bath and heated to a temperature of 60° C. and maintained at this temperature under autogenous pressure for a period of 85 minutes after which time conversion of the aqueous graft copolymer was essentially complete, as evidenced by the fact that steam distillation of a portion of the final latex did not carry any monomer overhead.

The graft copolymer was recovered as follows: The final latex was coagulated with dilute brine and sulfuric acid, heated to 95° C. to produce partial granulation of the coagulated product to facilitate subsequent filtration and washing operations, filtered, washed and finally dried to constant weight at 110° C.

The graft copolymer was molded and the properties of the molded product were as follows:

| | |
|---|---|
| Izod impact strength, ft. lb./inch notch, $\frac{1}{8}''$ bar | 3.0 |
| Tensile strength, p.s.i., 73° F. | 2900 |
| Tensile elongation _____percent | 50 |
| Hardness, Shore D | 64 |
| Melt index, 410° F. | [2] WNE |
| Flexural modulus, p.s.i., $\frac{1}{4}'' \times \frac{1}{2}'' \times 6''$, 73° F. | $1.4 \times 10^5$ |
| Flexural strength, 73° F. | 4460 |
| Deflection temperature, ° F., $\frac{1}{2}'' \times \frac{1}{2}'' \times 5''$ bar, 12 p.s.i. | 201 |
| Deflection temperature, ° F., $\frac{1}{2}'' \times \frac{1}{2}'' \times 5''$ bar, 66 p.s.i. | 183 |
| Deflection temperature, ° F., $\frac{1}{2}'' \times \frac{1}{2}'' \times 5''$ bar, 264 p.s.i. | 160 |

[2] Will not extrude under the heretofore defined melt index.

PREPARATION OF BLEND

The poly(methyl methacrylate) and the graft copolymer were blended at various poly(methyl methacrylate)-graft copolymer ratios. In making the blends, the poly(methyl methacrylate) and the graft copolymer were mixed with one part by weight of calcium stearate and the mixture was worked in a Banbury mixer at a temperature of about 420° F. Milling was then continued on a two-roll mill until a uniform blend was obtained, and the blend was then sheeted. The physical characteristics of the resulting blends were as follows:

*Table I*

| Sample | A | B | C | D | E |
|---|---|---|---|---|---|
| Poly(methyl-methacrylate) | 80 | 60 | 50 | 40 | 20 |
| Graft copolymer | 20 | 40 | 50 | 60 | 80 |
| Ca Stearate | 1 | 1 | 1 | 1 | 1 |
| Izod Impact Strength, ft. lb./inch notch $\frac{1}{8}''$ bar | .79 | 1.2 | 1.6 | 1.7 | 2.0 |
| Tensile Strength, p.s.i., 73° F. | | 6,600 | 5,900 | 5,300 | 4,000 |
| Tensile Elongation, percent | | 5 | 20 | 20 | 30 |
| Hardness, Rockwell | R-121, L-101 | R-108 | R-113, L-85 | R-103 | R-85 |
| Melt Index, 410° F.[1] | .8A1 | .8A1 | .6A1 | .5A1 | .6A3 |
| Flexural Modulus, p.s.i. $\frac{1}{4}'' \times \frac{1}{2}'' \times 6''$, 73° F. | $3.6 \times 10^5$ | $3.2 \times 10^5$ | $2.8 \times 10^5$ | $2.5 \times 10^5$ | $2.1 \times 10^5$ |
| Flexural Strength, 73° F. | 12,990 | 11,400 | 9,950 | 8,620 | 6,750 |
| Deflection Temperature, ° F., $\frac{1}{2}'' \times \frac{1}{2}'' \times 5''$ bar 66, p.s.i. | 210 | 199 | 193 | 191 | 186 |
| Deflection Temperature, ° F., $\frac{1}{2}'' \times \frac{1}{2}''  \times 5$ bar 264, p.s.i. | 185 | 178 | 174 | 169 | 163 |

[1] Modified A.S.T.M. Method D-1238 as heretofore defined.

Blends prepared in accordance with this invention may contain additional components, such as for example, pigments, fillers and the like, which are frequently incorporated into resins and resin blends in accordance with conventional practices well known to those skilled in the art.

As evidenced by comparison of the physical properties of the poly(methyl methacrylate) and the graft copolymer with the blends of these two materials, the thermoplasticity, as exemplified by the melt index, of Samples A-D inclusive is strikingly better for molding purposes than either of the blending components.

In the preparation of the graft copolymer blending component of this invention, the styrene may be replaced, in part or entirely, by alpha methyl styrene, vinyl toluenes, alpha methyl vinyl toluenes and the like, including mixtures of two or more such alkenyl substituted mononuclear aromatic hydrocarbons. Also, the acrylonitrile may be replaced, in part or entirely, with other alkenyl cyanides such as methacrylonitrile and ethacrylonitrile.

The blends of the present invention find their field of greatest usefulness in the fabrication of shaped articles that are most economically produced by injection molding techniques, particularly rigid shaped articles that are subjected to stresses during assembly and that may be subsequently subjected to vibration, shock, impact loads, and the like during use. Also, the blends of this invention may be processed by calendering, vacuum forming, extrusion, and similar known production techniques.

While this invention has been described in connection with certain specific details and examples thereof, these details and examples are illustrative only and are not to be considered limitations on the spirit or scope of said invention except insofar as these may be incorporated in the appended claims.

We claim:
1. A molding composition comprising a blend of (A) poly(methyl methacrylate) and (B) a graft copolymer prepared from (1) a rubber latex produced by polymerization of a conjugated diene, wherein the latex particles are less than 1,000 angstroms in size and (2) a mixture of an ethylenically unsaturated cyanide selected from the group consisting of acrylonitrile, methacrylonitrile, and ethacrylonitrile and a vinylidene aromatic hydrocarbon.

2. A molding composition comprising a blend of (A) poly(methylmethacrylate) and (B) a graft copolymer prepared from (1) a rubber latex produced by polymerization of a conjugated diene selected from the group consisting of butadiene homopolymer latices and butadiene copolymer latices, wherein the latex particles are less than 1,000 angstroms in size and (2) a mixture of an ethylenically unsaturated cyanide selected from the group consisting of acrylonitrile, methacrylonitrile, and ethacrylonitrile and a vinylidene aromatic hydrocarbon.

3. A molding composition comprising a blend of (A) poly(methyl methacrylate) and (B) a graft copolymer prepared from (1) polybutadiene rubber latex, the latex particles therein being of a size less than 1,000 angstroms and (2) a mixture of an ethylenically unsaturated cyanide selected from the group consisting of acrylonitrile, methacrylonitrile, and ethacrylonitrile and a vinylidene aromatic hydrocarbon.

4. A molding composition comprising a blend of (A) from about 80 to about 20 parts by weight of poly(methyl methacrylate) and (B) correspondingly from about 20 to about 80 parts by weight of a graft copolymer prepared (1) a rubber latex produced by polymerization of a conjugated diene, the latex particles therein being less than 1,000 angstroms in size and (2) a mixture of an ethylenically unsaturated cyanide selected from the group consisting of acrylonitrile, methacrylonitrile, and ethacrylonitrile and a vinylidene aromatic hydrocarbon.

5. A molding composition comprising a blend of (a) poly(methyl methacrylate) and (b) a graft copolymer prepared from (1) polybutadiene rubber latex, the latex particles having a size of less than 1000 angstroms, and (2) a mixture of acrylonitrile and styrene.

6. A molding composition comprising a blend of (a) from about 80 to 20 parts by weight of poly(methyl methacrylate) and (b) correspondingly from about 20 to 80 parts by weight of a graft copolymer prepared from (1) polybutadiene rubber latex, the latex particles having a size of less than 1000 angstroms, and (2) a mixture of acrylonitrile and styrene.

References Cited by the Examiner
UNITED STATES PATENTS

| | | | |
|---|---|---|---|
| 2,802,808 | 8/57 | Hayes | 260—876 |
| 2,802,809 | 8/57 | Hayes | 260—876 |

OTHER REFERENCES

Noble: "Latex in Industry," 2nd edition, page 189, 1953, N.Y., Palmerton Publishing Co., Inc., N.Y.

Krczil: "Kurzes Handbuch der Polymerisations-technik," volume II, page 736, published by Akademische Verlagsgesellschaft, Becker and Erler Kom.-Ges., Leipzig (194).

LEON J. BERCOVITZ, *Primary Examiner.*

WILLIAM H. SHORT, *Examiner.*